(12) United States Patent
Biglari et al.

(10) Patent No.: US 8,954,920 B2
(45) Date of Patent: Feb. 10, 2015

(54) APPARATUS FOR DEVELOPING EMBEDDED SOFTWARE AND A PROCESS FOR MAKING THE SAME

(76) Inventors: Haik Biglari, Frederick, MD (US); Andrey John Biglari, Huntsville, AL (US); Dorek Alan Biglari, Madison, AL (US); Eric Robert Grigorian, Huntsville, AL (US)

(*) Notice: Subject to any disclaimer, the term of this patent is extended or adjusted under 35 U.S.C. 154(b) by 60 days.

(21) Appl. No.: 13/416,809

(22) Filed: Mar. 9, 2012

(65) Prior Publication Data

US 2012/0272209 A1 Oct. 25, 2012

Related U.S. Application Data

(60) Provisional application No. 61/517,546, filed on Apr. 21, 2011.

(51) Int. Cl.
*G06F 9/44* (2006.01)

(52) U.S. Cl.
CPC .................................. *G06F 8/30* (2013.01)
USPC ........... 717/100; 717/102; 717/105; 717/124; 717/125; 717/126; 707/1; 707/15; 707/26

(58) Field of Classification Search
None
See application file for complete search history.

(56) References Cited

U.S. PATENT DOCUMENTS

| 7,085,670 | B2 * | 8/2006 | Odom et al. | 702/127 |
|---|---|---|---|---|
| 7,860,582 | B2 * | 12/2010 | Ghercioiu et al. | 700/1 |
| 8,667,470 | B2 * | 3/2014 | Lin et al. | 717/128 |
| 2003/0167345 | A1 * | 9/2003 | Knight et al. | 709/249 |
| 2003/0192032 | A1 * | 10/2003 | Andrade et al. | 717/124 |
| 2005/0143968 | A9 * | 6/2005 | Odom et al. | 703/21 |
| 2005/0289274 | A1 * | 12/2005 | Ghercioiu et al. | 710/303 |
| 2006/0015862 | A1 * | 1/2006 | Odom et al. | 717/168 |
| 2008/0127065 | A1 * | 5/2008 | Bryant et al. | 717/109 |
| 2009/0319058 | A1 * | 12/2009 | Rovaglio et al. | 700/17 |
| 2010/0192122 | A1 * | 7/2010 | Esfahan et al. | 717/105 |
| 2010/0235285 | A1 * | 9/2010 | Hoffberg | 705/75 |
| 2011/0067001 | A1 * | 3/2011 | Heintel et al. | 717/106 |
| 2013/0097594 | A1 * | 4/2013 | Swarna | 717/168 |

* cited by examiner

*Primary Examiner* — Chameli Das

(57) ABSTRACT

An apparatus used as a platform for developing embedded real-time software for controlling fault tolerant opto-electromechanical systems. The platform provides a portable model-based design environment conducive to validation and verification of the Control Laws and of the Plant model. The platform is also useful for observing the overall system behavior by injecting faults or failures which can be destructive, expensive or difficult if applied to the real system. The platform is comprised of multiplicities of serial data ports, serial port converters, single board microcontrollers, and external interfaces. The apparatus includes at least one interface board that cross connects at least two microcontrollers and allows the downloading of the Plant and Control algorithms to each microcontroller through available serial interfaces enabling evaluation of the modeled system behavior. The apparatus includes an embedded software development tool-chain facilitating an order of magnitude increase in embedded software development productivity.

3 Claims, 10 Drawing Sheets

APPARATUS FOR DEVELOPING EMBEDDED SOFTWARE AND A PROCESS FOR MAKING THE SAME

TECHNICAL FIELD

Certain embodiments of the present disclosure generally relates to embedded systems and, more particularly, to the filed of realtime control

BACKGROUND

The software industry has seen some dramatic changes from the early days of computer technology development. Until the early 1980's computer software was written manually and the design process was ad-hoc. In the 1980s, Yordon and Demarco introduced Structured SW Design Methodology. The techniques were a powerful method based on the divide and conquer concept. The structured design methodology paved the way to automatic code generation.

In 1989, Lary LEHMAN, et al of Integrated Systems Incorporated (U.S. Pat. No. 4,796,179) entitled: Multirate real time control system code generator which is an application software for graphical programming. At the same time, under the leadership of Haik BIGLARI a group of SW engineers in the Boeing company began to undertake the task of automating code generation, in a project called, "Application Generator" [4].

Development of any intelligent system is a multi-disciplinary activity. Due to the complexities and natural evolution of these disciplines, the corresponding domain experts have developed their own methods of communication. As a result, there is a communication gap between these disciplines, which gives rise to significant loss of productivity. Although the automatic code generation has increased the productivity of the programmer, still the gap between different disciplines remained wide.

In the early 2000, rapid prototyping with automatic code generation attempted to narrow the gap. In 2001, Kodosky et al, (U.S. Pat. No. 6,173,438) disclose: Embedded Graphical Programming System. In 2006, Mike Santori (U.S. Pat. No. 7,076,740) discloses a patent titled: System and Method for Performing Rapid Control Prototyping Using a Plurality of Graphical Programs that Share a Single Graphical User Interface. In 2007, Borg et al. (U.S. Pat. No. 7,197,743) disclose: Methods for Generating Computer Software for Embedded Systems. In 2009, Kodosky et al, (U.S. Pat. No. 7,558,711) disclose: Generating Hardware Description of a Block Diagram Model Implementation on a Programmable Hardware.

SUMMARY OF THE INVENTION

The primary object of the invention is to provide a cost effective rapid prototyping environment for System Engineering analysis and Software development.

Another object of the invention is to provide an environment for multiple engineering disciplines to collaborate on the same platform.

Another object of the invention is to narrow the gap between software engineers, hardware engineers and systems engineers.

A further object of the invention is to help identify software or system problems early in the development life cycle.

Yet another object of the invention is to support conventional as well as model based design methodology.

Still yet another object of the invention, is that the invention naturally lends itself to Automatic Code Generation.

Another object of the invention, is that the invention improves software maintainability.

Another object of the invention, is that the invention increases the efficiency associated with embedded software testing.

A further object of the invention, is that the invention can identify discrepancies in requirements early in the software development life cycle.

Yet another object of the invention, is that the invention facilitates transfer of the developed software to the target processor.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a Platform for Developing Embedded Software comprising: A laptop or a Personal Computer with printer port, two USB (Universal Serial Bus) to CANbus (Control Area Network Bus) converters, One USB to RS-232 converter, two single board microcontrollers, interface board interfacing the two microcontrollers, and software development tool chain.

BRIEF DESCRIPTION OF THE DRAWING

The drawings constitute a part of this specification and include exemplary embodiments to the invention, which may be embodied in various forms. It is to be understood that in some instances various aspects of the invention may be shown exaggerated or enlarged to facilitate an understanding of the invention. There are total of 10 drawings, each illustrating an aspect of the invention. The drawings are not drawn to scale to better emphasize the component under consideration. The Present invention houses multiplicity of microcontrollers and the interconnecting interfaces.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather, as a basis for the claims and as a representative basis for teaching one skilled in the art, to employ the present invention in virtually any appropriately detailed system, structure or manner.

Figure 1:
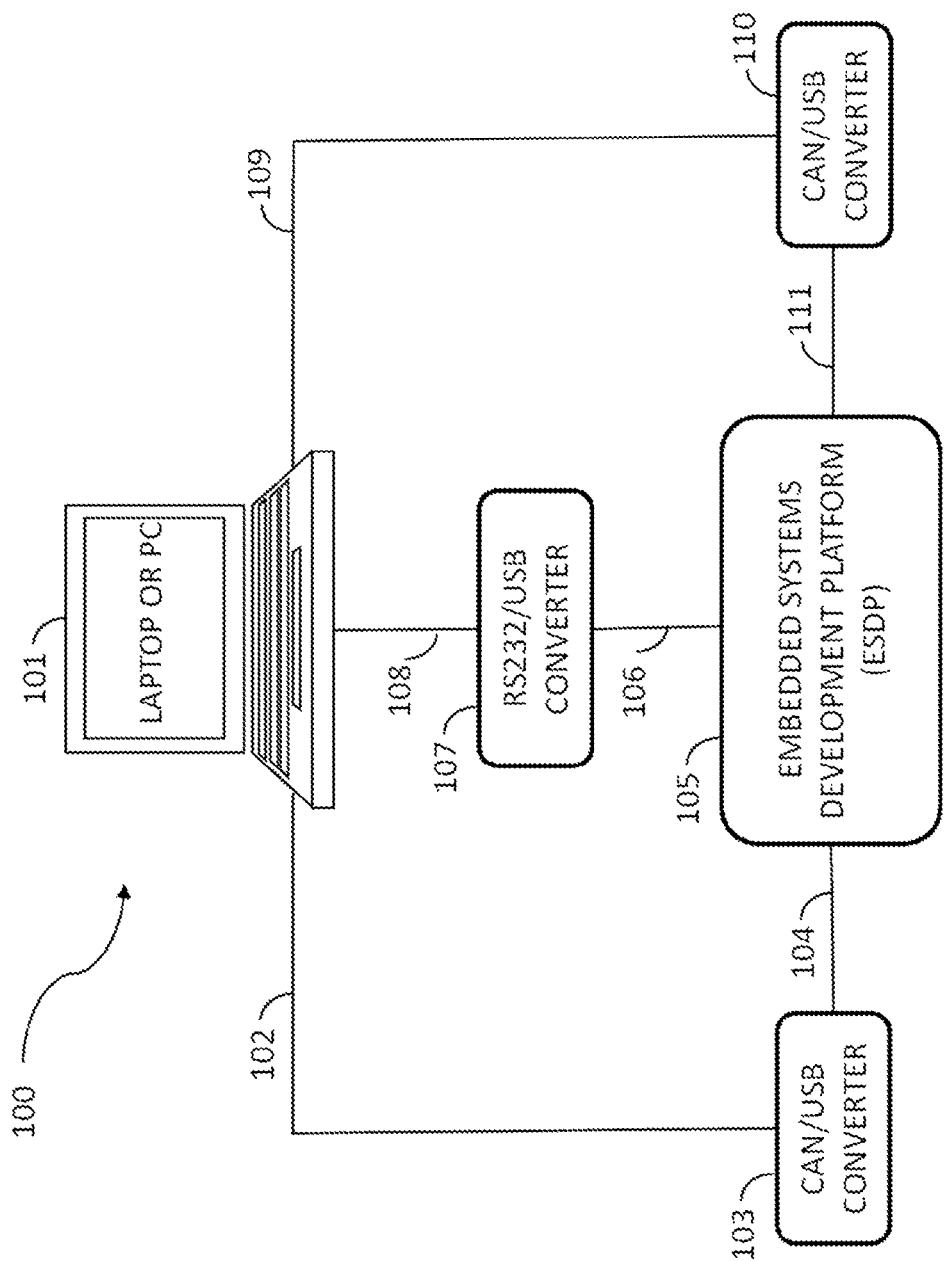
FIG. 1 illustrates an example of realtime software development environment in accordance with certain embodiment of the present disclosure.

Turning first to FIG. 1, the figure captures the embedded software development environment 100, which includes an Embedded System Development Platform (ESDP) 105. A laptop 101 with a rapid software development tool-chain. It also includes, multiplicity of interface converters for USB as a potential interface among others. For instance CAN/USB converter 103 may be connected to LAPTOP 101 via a USB cable 102. The other side of the converter 103 may be connected to ESDP 105 to provide information in regards to the evolution of the plant model residing in the ESDP 105 via CANbus 104 for the user station at LAPTOP 101.

In addition, information in regards to the evolution of the controller model residing in ESDP 105 may be transmitted via CANbus 111 to CAN/USB converter 110 via USB cable 109 to the user located at LAPTOP 101.

Furthermore, the user located at the station 101 may communicate with the controller residing in ESDP 105 during its operation via a separate channel. For instance this channel could be an RS232 interface. In station 101 if RS-232 is available then it me directly interface with ESDP 105. If station 101 is equipped with USB, then standard RS232 converter 107 can be utilized which uses USB cable 108 and RS232 cable 106.

Figure 2:
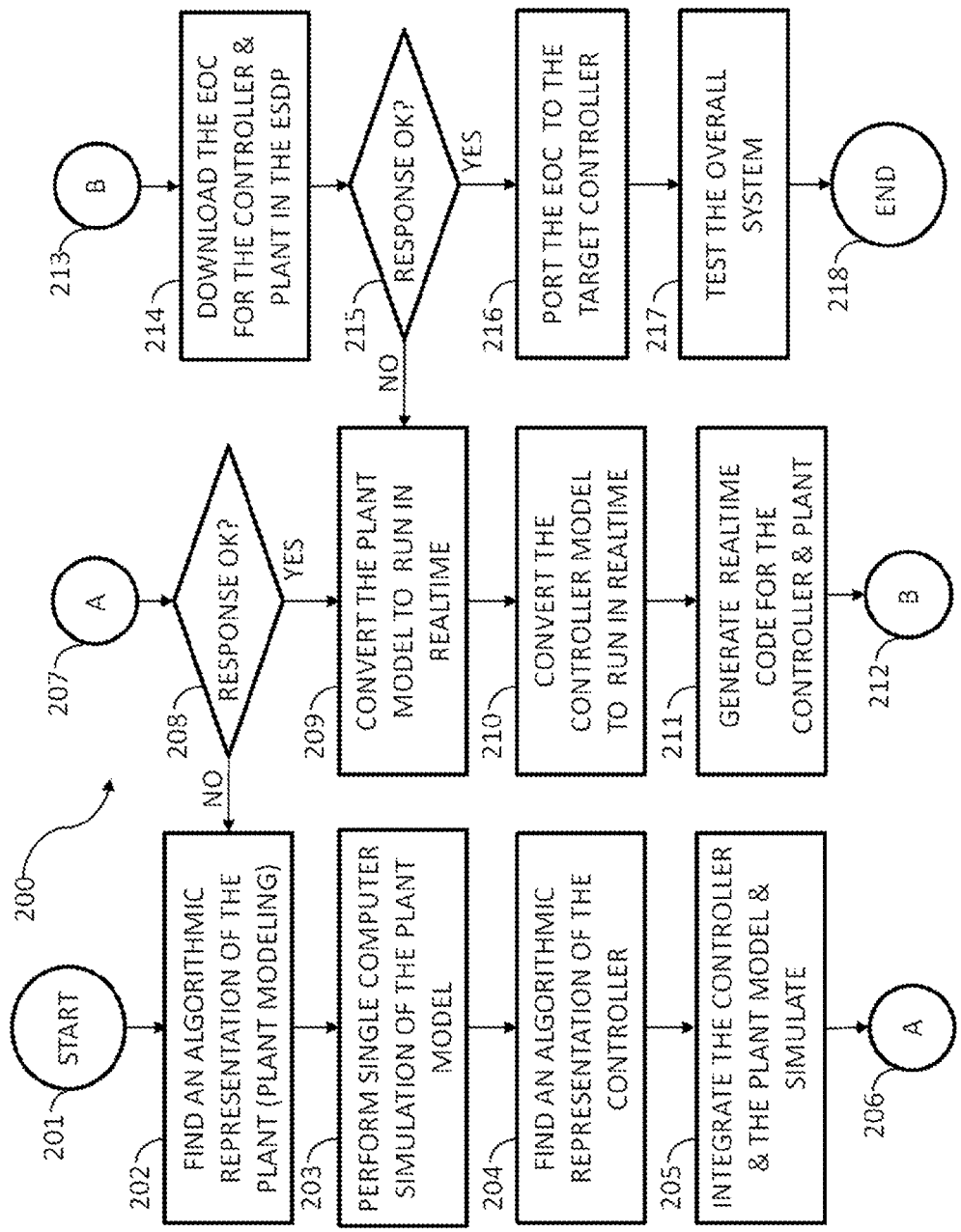
FIG. 2 illustrates various processes which may be utilized in realtime embedded software development in accordance with certain embodiment of the present disclosure.

Turning to FIG. 2, the figure illustrates a Model Based Design (MDB) approach 200 which may be utilized with certain embodiment of the present disclosure. The operation of this approach begins with the development of the overall system model and ends with the generation of the executable code for the target processor.

The process begins at the START 201. Based on the requirements of the plant portion of the system, the user of ESDP 105 finds an algorithmic representation of the plant 202. The algorithmic representation may be combination of algebraic equation, linear or non linear differential equations, and/or may be described by a set of linear or non linear difference equations. Alternatively, the plant model 202 may be described by a quintuple.

To validate and verify the plant model 202, it may be simulated on a digital computer 203.

To regulate or control the plant, the user finds an algorithmic representation of the controller which is commonly known as the control law 204.

The user then integrates the control law 204 with the plant model 202, to obtain the overall system which is simulated on a digital computer 205.

The process flow continues via bubbles 206 and 207 to the decision block 208 where the user examines the system response to see if it meets the system requirements. If the requirements are not met then the user goes back to block 202.

If the requirement are met, the plant model is converted to run in realtime 209 which may use the plant portion of ESDP 105.

Similarly, the controller model is converted to run in real-time 210 which may use the controller portion of ESDP 105.

With the aid of appropriate set of tool chain, the user generates realtime Executable Object Code (EOC) for the controller and the plan 211.

The process continues via bubbles 212 and 213. The user then down downloads the EOC 214. The controller gets downloaded into the controller portion of the ESDP 105 via CANbus 104 and the plant model gets downloaded into the plant portion of ESDP 105 via CANbus 111.

The response of the realtime system simulation is verified and validated against the overall system requirements in the decision block 215. If the requirements are not met then the user goes to block 209.

If the system requirements are met, then the EOC is ported to the target Controller 216.

The system including hardware and software is tested in 217 and the process ends at 218.

Figure 3:
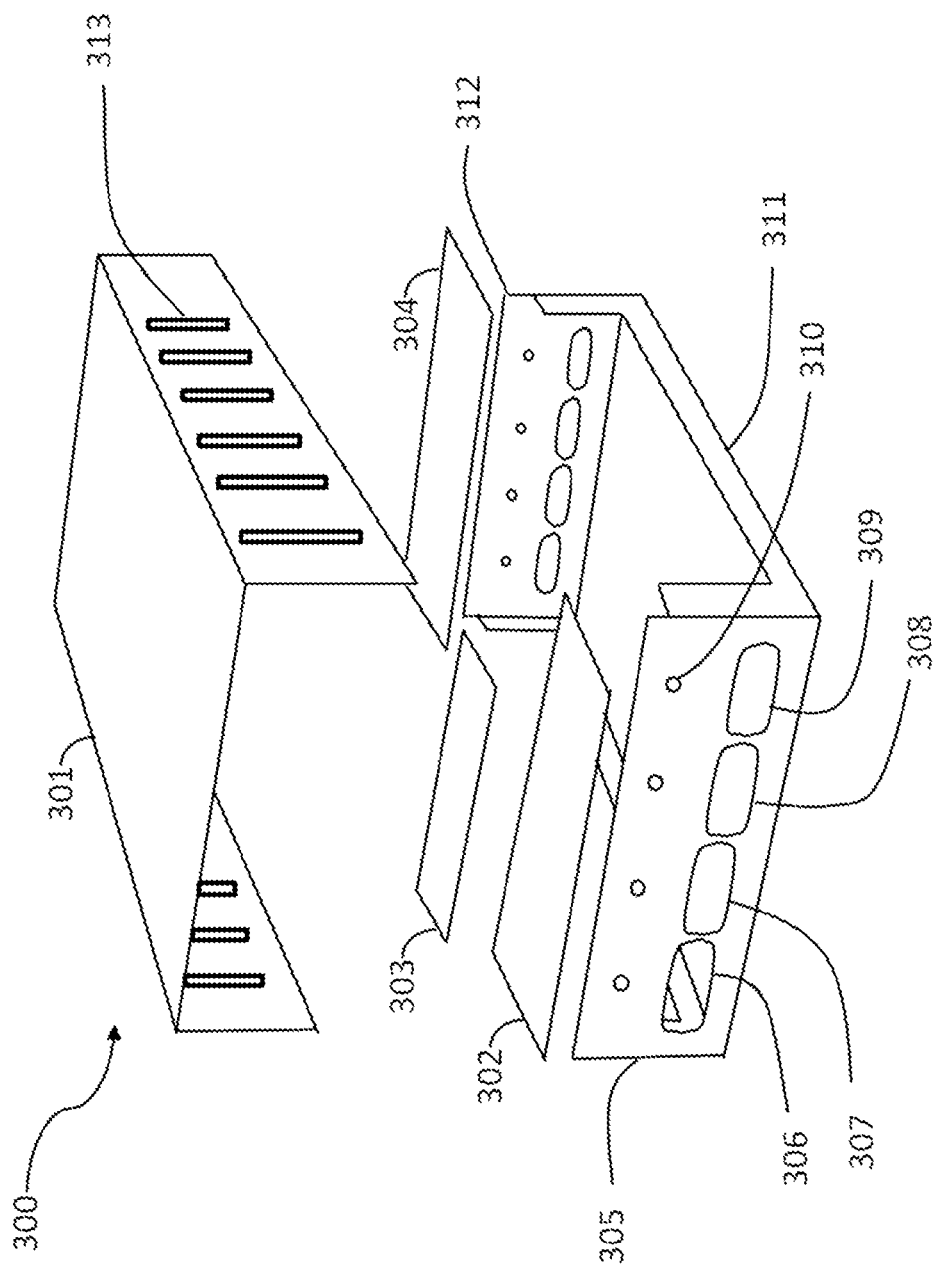
FIG. 3 illustrates the exploded view of the Embedded Software Development Platform in accordance with certain embodiment of the present disclosure.

Turning now to the drawing in FIG. 3, the drawing shows the exploded view of the ESDP 300. As it can be seen, typical ESDP has an enclosure which is composed of a top cover 301 and a bottom cover 311.

Figure 8:
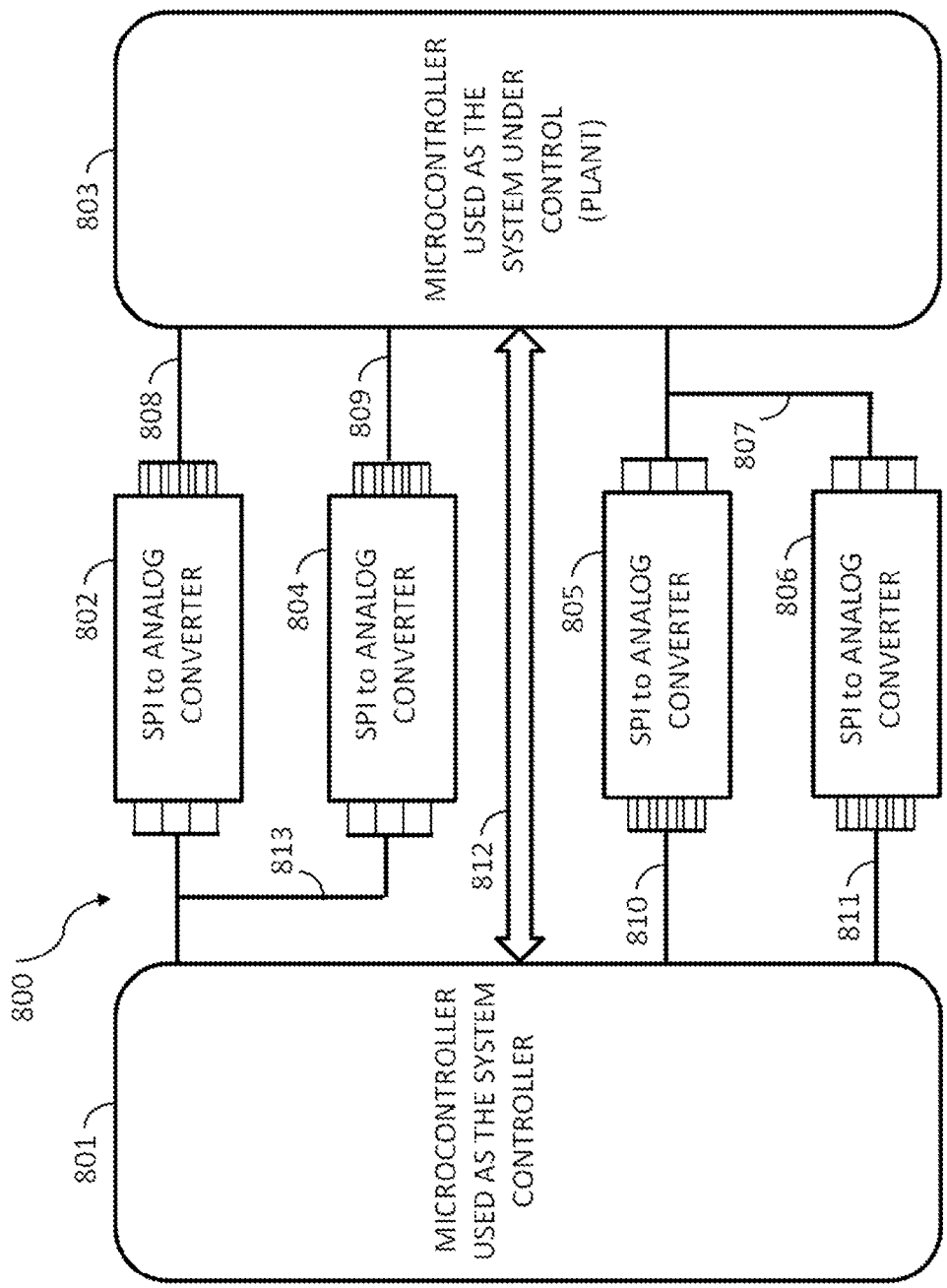
FIG. 8 illustrates major components and their interconnections in accordance with certain embodiment of the present disclosure.

Two single board microcontrollers (302, 304) and interface board 303 are designed to be interconnected according to FIG. 8. One of the microcontrollers is used to execute the controller model, while the other is used to execute the plant model. The number of microcontrollers are not limited to two, but it establishes the minimum set needed for adequate modeling.

The top cover 301 is has multiplicity of slits 313 to allow air cooling of the electronic components.

The front 305 and the back 312 have multiplicity of circular holes 310 for mounting multiplicity of light emitting diodes which show the status of the controller and the plant.

The front 305 and the back 312 have multiplicity of openings (306, 307, 308 and 309) for mounting the interface connectors for the CANbus (104, 111) and RS232 connector 106 respectively.

Figure 4:
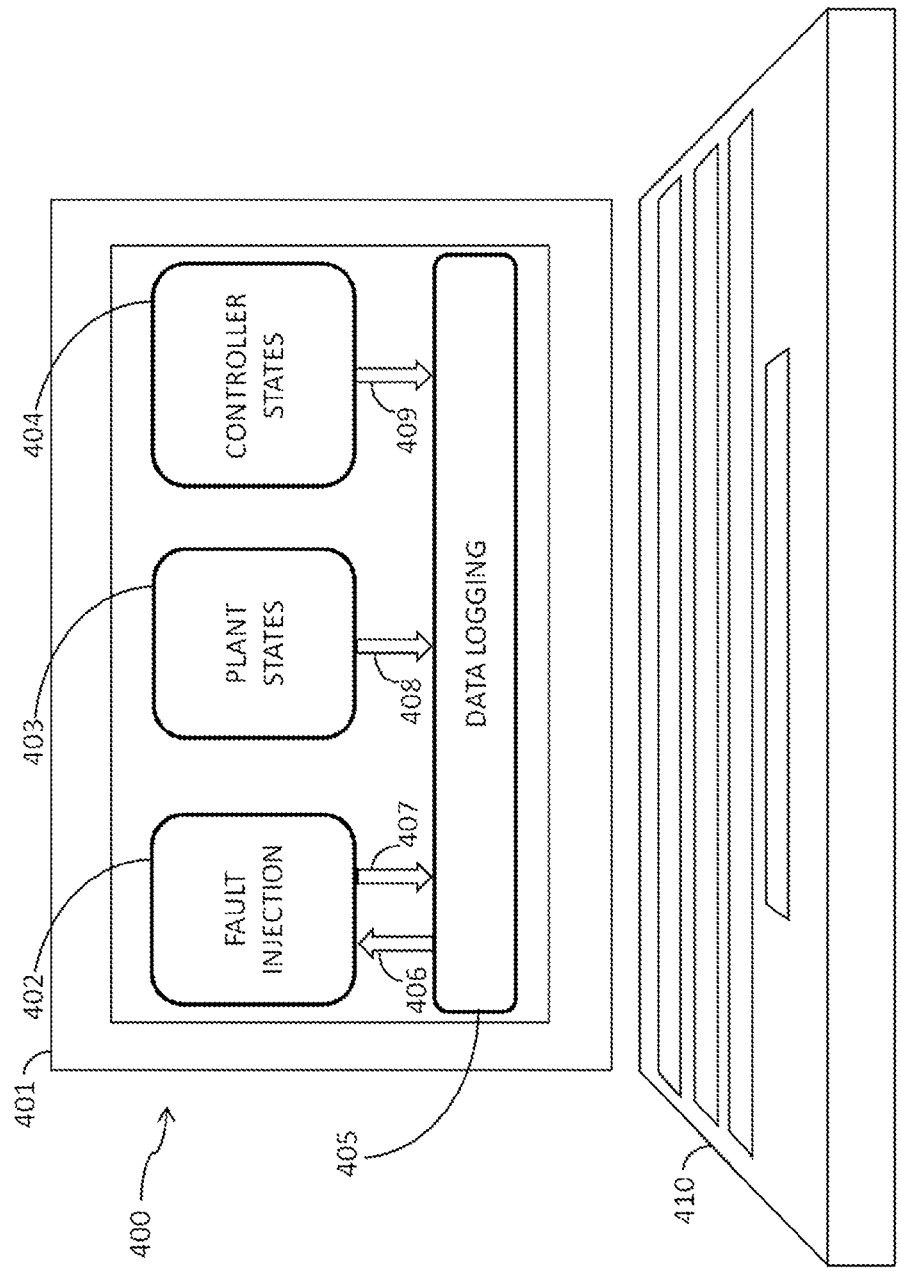
FIG. 4 illustrates an example Graphical User Interface that may be used with certain embodiment of the present disclosure.

In accordance with the present invention, FIG. 4, illustrates the Graphical User Interface 400 which is hosted on a computing platform such as a laptop or PC with screen 401 and keyboard 410. It provides means to interact with ESDP 105 and evaluate the performance of the implemented algorithm in the plant and the controller in real-time.

The screen is partitioned into multiplicity of segments. For instance, segment 402, may be used for injecting faults on the plant model 509, Segment 403 may be used to monitor the plant states and segment 404 may be used to monitor and/or alter the controller states.

Another segment of the screen may be used for data logging 405 via (407, 408 and 409). The logged data may be used for post mortem analysis.

Saved scenarios via the data logging 405 may be reused via 406 to automate the testing process.

Figure 5:
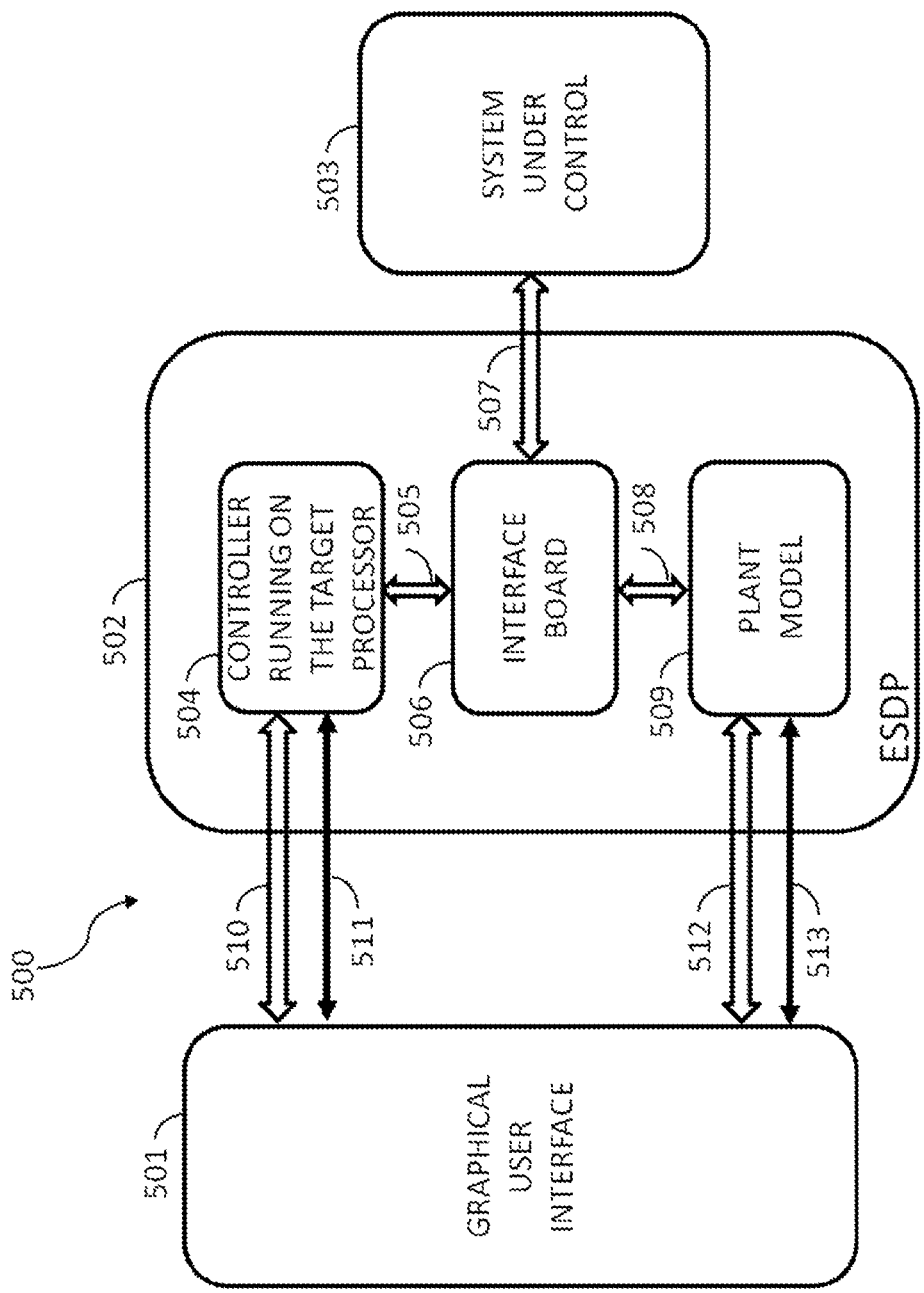
FIG. 5 illustrates a partial block diagram of the overall system development environment, in accordance with certain embodiment of the present disclosure.

In accordance with the present invention, FIG. 5 depicts a block diagram of the over all developmental environment 500. The environment provides means for real-time Hardware-In-the-Loop (HIL) simulation. Furthermore, the environment also provides means for real-time Software-In-the-Loop (SIL) simulation.

The detail features of Graphical User Interface (GUI) 501, is provided in FIG. 4. It interface with the ESDP 502, via multiplicity of CANbus cables (510, 512) and multiplicity of RS232 cables (511, 513). These cables provide hardware means to transmit the ESDP states to the GUI and allow the user to download EOC and influence the evolution of the EOC during execution.

Two EOCs are developed in the GUI. The first EOC is downloaded in the Controller processor 504 and the second EOC is downloaded in plant model processor 509.

The interface board 506 conditions the signal for processors 504 and 509 and provides means for external interfacing with system under control 503. Internal interfacing is accomplished by 505 and 508.

The external interface 507 can be a mixture of analog or digital signals as needed.

Figure 6:
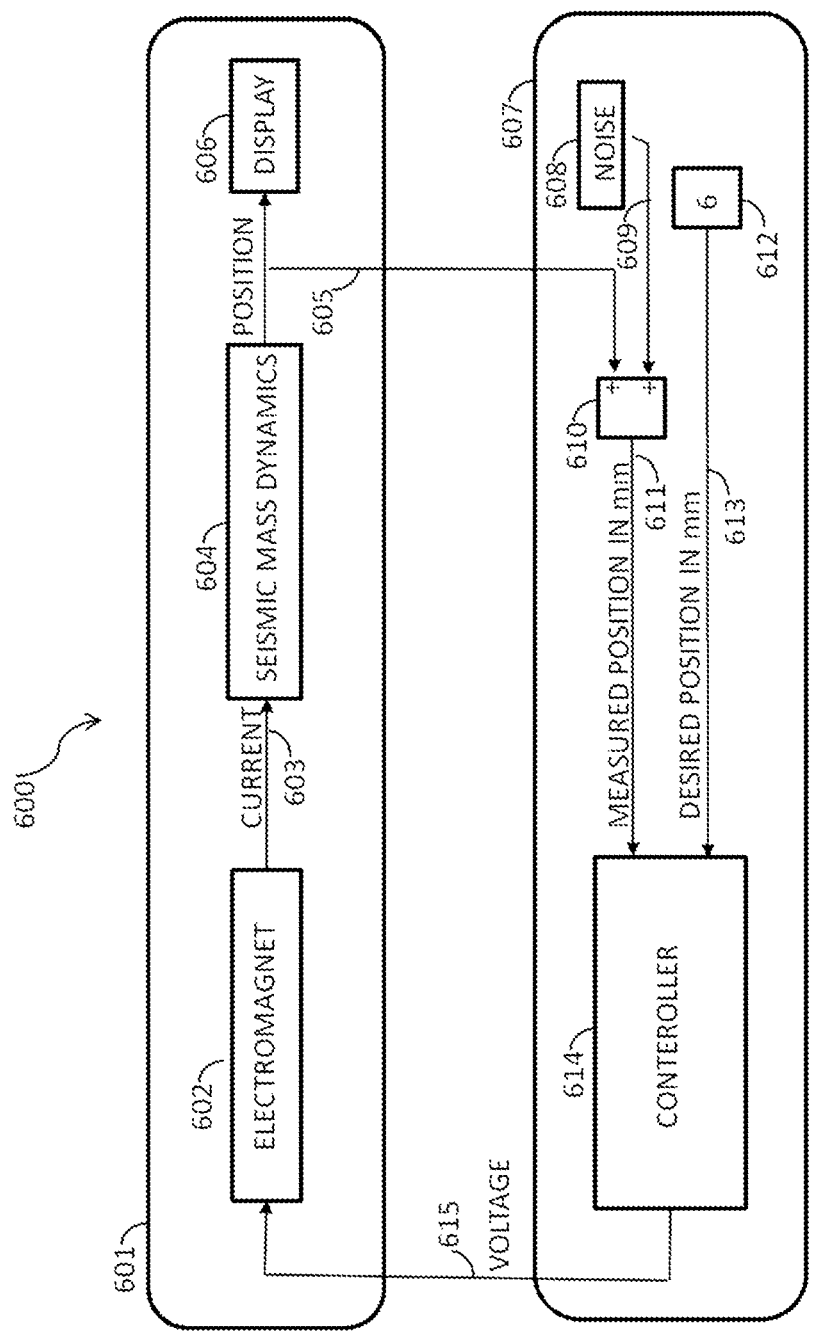
FIG. 6 illustrates an example of a typical application known as Magnetic Levitation System implemented in accordance with certain embodiment of the present disclosure.
Figure 7:
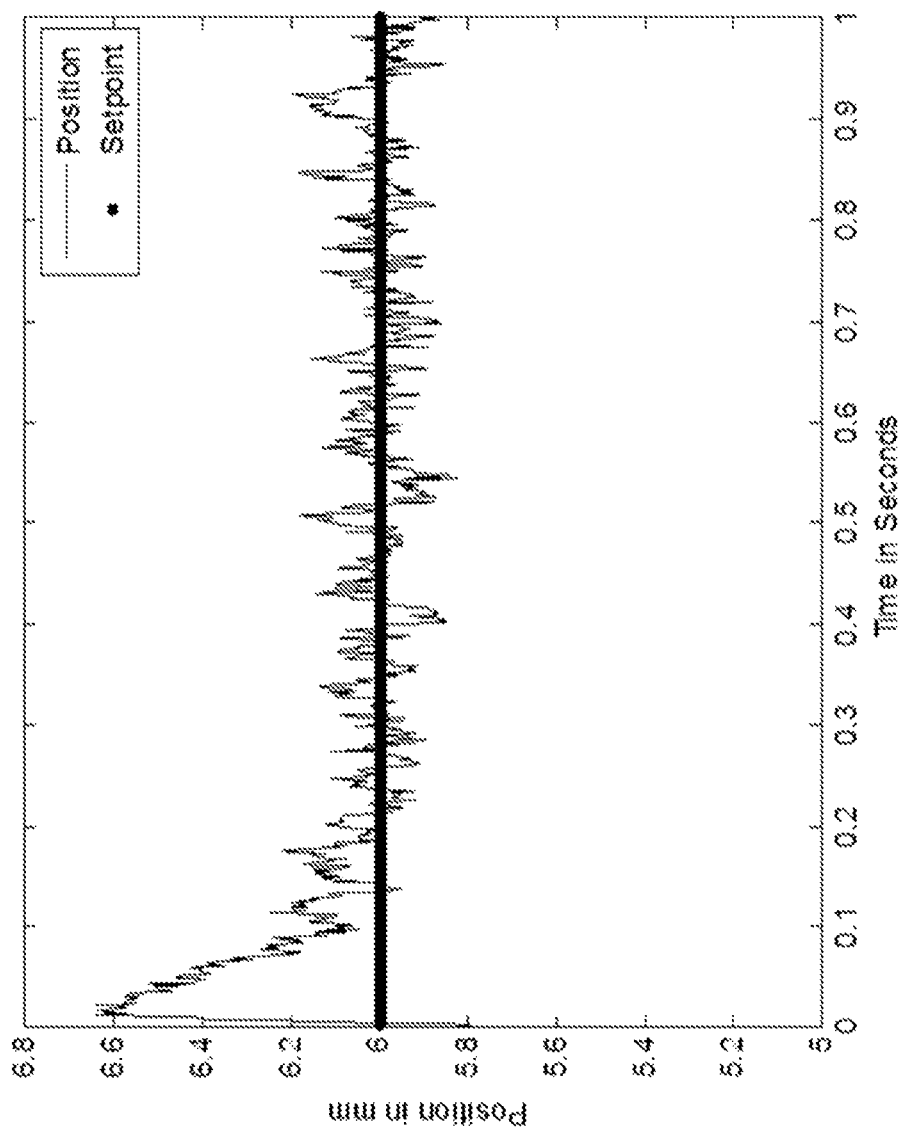
FIG. 7 illustrates an aspect of graphical user interface pertaining to the system response of the typical application shown in FIG. 6.

To accomplish an important function of the invention, it becomes necessary to simulate in real-time, both the plant and the controller in a single microcontroller. An example of this functionality is shown in FIG. 6. It also becomes necessary to display the simulation results in real-time. That functionality is shown in FIG. 7.

To provide a clear understanding of the invention and its variations, this inventions takes advantage of the recent development in microcontroller technology. Thereby, the size and weight of the control system prototyping is significantly reduced. The key to understanding of this inventions is the principle of duality that exists between controller and the plant. Based on this duality, a plant model may be executed in a microcontroller. There is only one problem with this scheme, the result of the execution must emulate real world signals, which are normally digital and analog type signals.

Present day microcontrollers do provide digital signals, but do not provide analog signals. To solve this problem, several techniques may be utilized. One approach is to use a Pulse Width Modulation followed by a low pass filter. Although this method is very inexpensive, it has three drawbacks. First, it is not very accurate. Second, it is very slow. Third, it uses too many digital channels. The accuracy issue can be addressed by providing a feedback and ensure that the desired analog value has been achieved. However, the second and third issue will remain unresolved.

The present invention resolves all of the three issues by utilizing a Serial Peripheral Interface (SPI) to analog converter as shown in FIG. 8. Interface board 506 is used to mount the required converters and signal conditioners.

To further reduce the size, weight and volume, any functionality that can be performed by a laptop, such as editing, compiling, and graphical user interfaces are not duplicated on the platform.

Due to the fact that current laptops no longer offer multiple types of interfaces, appropriate converters and their drivers will be needed. Fortunately, these types of converters are available commercially in the market. For instance, commercial RS232 to USB, and CANbus to USB converters are readily available. These converters have very little or no impact on the portability of this invention.

What makes the microcontrollers attractive for development of control laws targeted for embedded systems, is the fact that microcontrollers are designed to support multiple input/output (I/O) interfaces. The alternative is to use a microprocessor or Field programmable Gate Arrays (FPGA) with external I/O interfaces as suggested in [1] and [2]. These systems typically require a large number of I/O interfaces, and therefore will increase the size, weight, volume and cost and can no longer be carried in a briefcase. The present invention provides a much larger I/O capability with substantially smaller size, weight, volume and cost.

In an alternative implementation, multiple microcontrollers may be plugged into the same backplane, increasing the I/O capabilities by many folds.

The present invention can be used in conjunction with the Real-Time Workshop® automatic code generator. Alternatively, the present invention may be used in conjunction with any other manual or automatics code generators, such as LabView® or VisSim® which support the targeted microcontroller. In the preferred embodiment, Real-Time Workshop® with MPC555 microcontroller. The example shown here use the preferred embodiment.

The present invention can be easily built by utilizing two Phycore evaluation modules for MPC555 from Phytec, and an interface board shown in FIG. 8. All other signals from controller to the plant can be connected directly.

Reference [3] should be consulted for SPI drivers and software utilities. MPC555 is a representative core processor and other processors can also provide the equivalent functionalities.

Although the example system provided in FIG. 6 is a Single Input Single Output (SISO), the present inventions is well suited for Multiple Input Multiple Output (MIMO) systems as well. In fact, the present invention is suitable for every phase of embedded software development life cycle. For instance, it can be used during Systems Analysis and Design phase, during requirement definition phase, during software design phase, during software implementation phase, during software testing phase and during system testing phase.

Since the present invention supports Hardware-In the Loop (HIL) and Software-In the Loop testing, the platform can be used to take credit for DO-178B or DO-178C certification of Safety Critical Systems. Furthermore, it is possible to use the present invention, and test some aspect of the system that may be destructive or impossible to test, if it were to be performed on the actual system.

The benefits of rapid prototyping and model-based design is well understood in the field of real-time control algorithm development. Many graphical programming tools are available commercially, which facilitate rapid prototyping and model based design. For instance MATLAB is used extensively for model-based embedded software development and analysis. MATLAB also supports a large number of microcontrollers, microprocessors, and variety of I/O boards from many different manufacturers. There are also real-time platforms in the market which facilitate real-time embedded software development.

The real-time software platforms fail to provide realistic information about data latency and quantization effects, hardware platforms do provide this type of information, but they are not easily portable. Furthermore, due to large number of components they tend to be very heavy and expensive.

The present invention takes advantage of the duality between the controller and the plant. Under this duality, if the controller can be executed in a microcontroller, so is the plant. By invoking the duality principle, a large number of I/O capabilities built for microcontrollers can also be used for the plant model, which results in reduced size, weight, volume, and cost of a real-time platform for embedded system development.

To further reduce the cost of ESDP, the redundant functionality between the platform and laptop is removed from the ESDP. This includes display functionality and hosting the tool chain for the software development and testing.

The apparatus as described in this invention, is modular. A single microcontroller can be used for executing the real-time plant model, while a multiplicity of distinctively different microcontrollers can serve as target controllers. The converse also applies, that is, a single microcontroller can be used as the target controller while a multiplicity of microcontrollers can serve as the plant models.

In the preferred embodiment, the software tool chain includes but is not limited to:
1) MATLAB and Simulink for algorithm development
2) Real-Time Workshop for automatic code generation
3) LabView or Simulink for monitoring the system behavior
4) Visual Studio for compiling C program
5) TestBed from LDRA for Structural Coverage Analysis
6) Metowerks Codewarrior used as cross-compiler
7) Downloader running on the Laptop or PC
8) Bootcode used for the microcontrollers
9) USB to CANbus converter software
10) USB to RS232 to Converter software
11) USB based relay software for resetting the platform apparatus Similar to prior art, five to ten fold software productivity gain is expected for the apparatus described in this invention, while the size, weight, volume, and cost, are substantially smaller. In fact, the present invention can easily fit in a brief case, and it become, feasible for every software engineer, who develops real-time software for embedded control systems, to have one or multiple ESDP on their desk.

Furthermore, due to its reduced cost, system engineers and test engineers also, can have their very own ESDP. Therefore, the ESDP can be used as a common platform among diverse engineering disciplines, and thereby will provide additional productivity over and above what is provided by prior art.

Figure 9:
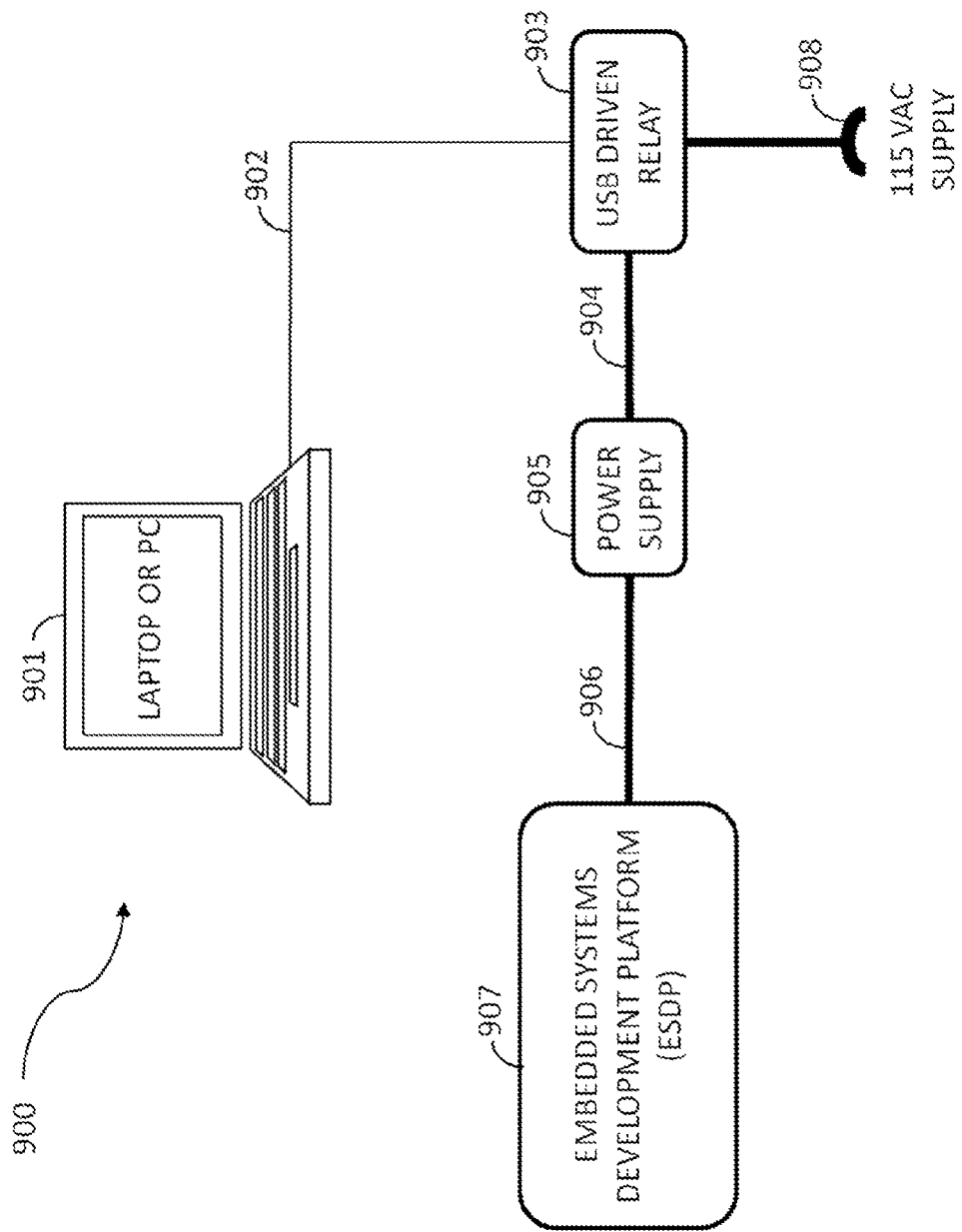
FIG. 9 illustrates a USB based relay that can be used to reset the operation the Embedded Software Development Platform (ESDP) in accordance with certain embodiment of the present disclosure.

When the EDSP is used for testing the system under development, the USB based relay 903 may be controlled from a set of test scripts and automate the entire testing process (see FIG. 9). In that application, ESDP can be reset by the laptop via USB interface 902 whenever the controller enters a shutdown mode.

The ESDP 907 is energized/de-energized when the power supply 905 and its cable 904 are disconnected from power 908 via the USB driven relay 903

Figure 10:
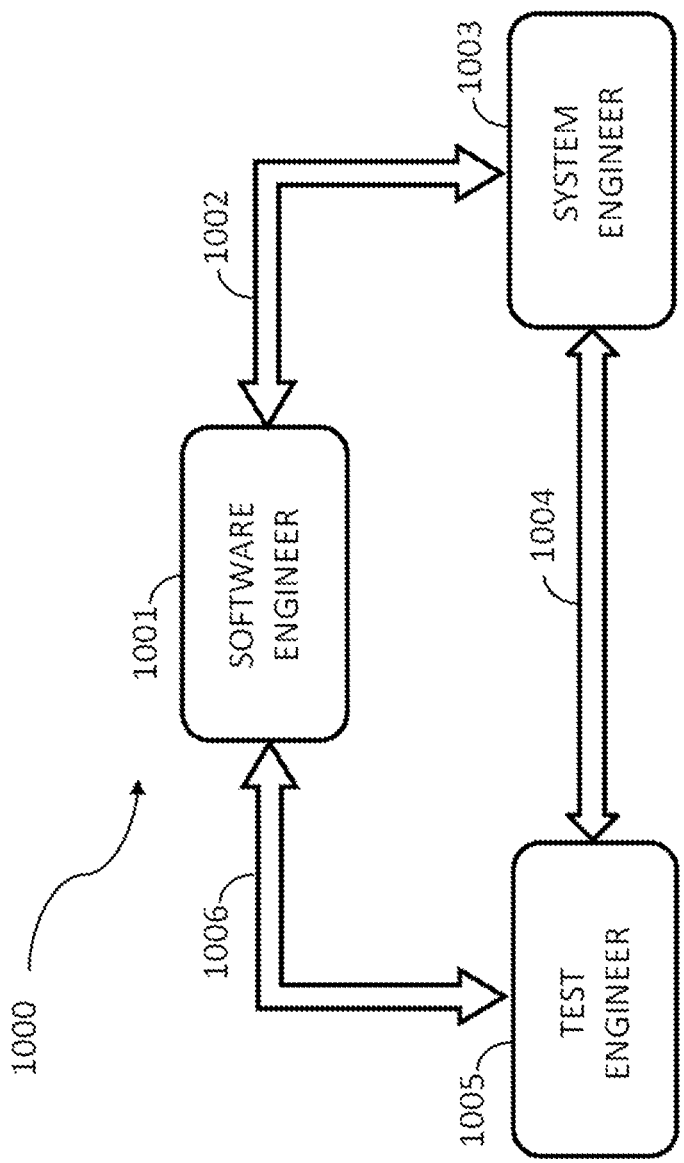
FIG. 10 illustrates the interaction of three disciplines via a common ESDP in accordance with certain embodiment of the present disclosure.

Turning to FIG. 10, when the ESDP is used by systems engineers 1003, they will be able to interact with the system and examine different aspects of system operations and revise the system specification accordingly. For instance, they can inject faults or cause certain component of the system to fail, and see how this fault is detected by the controller and provide feedback to the software engineer via 1002. Alternatively, they may want to use the ESDP to formulate a strategy for diagnostic or prognostic of the system under development. Therefore, the systems engineer, not only gains a better understanding of the control laws, but also is able to study the behavior of the plant.

As the system testing progresses by the test engineer 1005, he will be able to provide independent feedback to the software engineer 1001 via 1006, and to the system engineer via 1004. The methodology lends itself nicely to discover the bugs early in the development phase, which has been proven to reduce the overall development cost considerably. It is entirely possible for all three tasks to be performed by a single person, who is versed in all three disciplines and the man power resources are limited.

Clearly, the advantage of the present invention is a common platform which facilitates better communication among all stakeholders of the system to be developed. A better communication leads to higher efficiency and productivity.

The apparatus presented in the present invention is a hardware platform, along with a set of software and additional auxiliary hardware, which provides an environment for cost effective development of embedded systems.

While the invention has been described in connection with a preferred embodiment, it is not intended to limit the scope of the invention to the particular form set forth, but on the contrary, it is intended to cover such alternatives, modifications, and equivalents, as may be included within the spirit and scope of the invention, as defined by the appended claims.

What is claimed is:

1. A model-based embedded hardware and software development system referred to as a platform, comprising:
   a host which is either a laptop computer or personal computer;
      wherein a host memory stores an executable model (Executable Object Code or EOC) of a Plant;
      wherein the Plant is of opto-electro-mechanical type;
      wherein the Plant has a Controller;
   wherein the host memory also stores an executable model (EOC) of the Controller;
      wherein the Plant EOC and the Controller EOC are model-based representations;
      wherein the Plant EOC represents a behavior of a system Under Control;
      wherein the Controller EOC represents the behavior of a Control System;
      wherein the behaviors of the System Under Control and Control System represents an overall system behavior;
   a portable embedded hardware device referred to as the Platform which is coupled to the host;
      wherein the Platform interfaces to the host through digital serial interfaces;
      wherein the Platform includes:
         at least two embedded microcontrollers;
         at least one cross connect interface board connecting the two microcontrollers to each other;
            wherein a first microcontroller is identified as a Plant Simulator and a second microcontroller is identified as a Controller Simulator;
            wherein the microcontrollers have a multiplicity of analog and digital ports;
            wherein the executable model of Plant(s) are downloaded into their corresponding Plant microcontroller(s);
            wherein the executable model of Controller(s) are downloaded into their corresponding Controller microcontroller(s);
            wherein a cross connect interface board connects analog and digital ports of a pair of microcontrollers (Plant Simulator and Controller Simulator) to each other;
            wherein the host is used for injecting faults or failures into the plant Simulator, which subsequently is detected by the Controller Simulator;
            wherein the host can reset operation of the Platform through digital serial interface based relays to prepare a system for injection of faults;
   the system also includes a set of compatible
      software development tool-chain comprising:
         a serial interface driver to convert serial digital signals to analog signals through Digital to Analog Converters (DACs);
         a software tool to set/reset the platform during the testing and validation and verification phase;
            wherein the overall system behavior is validated and verified against an overall system requirement;
         a Graphical Programming Tool (GPT) to represent numerical computation and conversion of graphical model-based system design to software code;
            wherein the GPT has a code generation tool;

wherein the code generation tool is used to generate code from the graphical representation of the Plant model and the Controller model;
a compiler tool to generate EOC for the microcontrollers;
a software Graphical User Interface (GUI) tool;
   wherein the GUI tool is used to monitor the overall system behavior;
   wherein the GUI tool is also used to induce fault and failure into the Plant;
   wherein the GUI tool is used to capture the overall system behavior;
a downloader tool to download the executables into the microcontrollers;
   wherein the executable codes are downloaded into each microcontrollers using the downloader tool;
   wherein the Platform begins execution of the EOC of the Plant and the EOC of the Controller whenever the Platform is energized;
and, wherein the combined functionality of the software tool-chain and hardware is to facilitate an environment for developing certifiable model-based embedded real-time fault-tolerant software for safety-critical opto-electro-mechanical systems which are under development or are under consideration for development.

2. The system of claim 1, wherein the environment includes a process for developing embedded software comprising:
generating a Plant Model based on a mathematical representation of the opto-electro-mechanical Plant derived from basic physical laws governing the Plant;
generating a set of Control Laws based on a mathematical representations of the Control System derived from the overall system requirements;
implementing the Plant Models and the Control Laws in the host using GPT;
generating a real-time code corresponding to each Plant Model using the GPT code generator tool:
   wherein executable code for each Plant Model is obtained by compiling real-time code corresponding to each Plant Model using the compiler tool;
   wherein executable Plant Model code for each microcontroller is obtained by using a compiler;
generating a real-time code corresponding to each Control Law model using the GPT code generator tool:
   wherein executable code for each Control Law is obtained by compiling real-time code corresponding to each Control Law using the compiler tool;
   wherein executable Control Law code for differing microcontrollers is obtained by using the compiler;
downloading each executable code into the corresponding microcontroller using the downloader tool:
   wherein downloading each executable code to its corresponding microcontroller using the downloader;
      wherein the downloaded executable codes constitute the embedded software;
   wherein the Control Laws and the Plant models are executed in real-time in the microcontrollers;
   wherein the Plant EOC and the Controller EOC include a set of states which are evolved in time;
   wherein the states are logged in a data set by the host for post mortem analysis representing a simulation of the control system and system under control;
and, wherein the process result in an embedded real-time software for opto-electro-mechanical systems which are under development or are under consideration for development.

3. The system of claim 2, wherein the environment for developing embedded software includes capabilities consisting essentially of:
an environment for control algorithm development;
   wherein the environment supports Software-In-the-Loop (SIL), and Hardware-In-the-Loop (HIL) simulations;
   wherein the environment is portable due to very small physical size;
   wherein the environment increases productivity due to a selection of a software development tool chain which boosts a software development productivity by an order of magnitude;
   wherein the environment is useful in supporting all phases of a software development life cycle;
and, wherein the platform establishes a suitable environment for developing real-time model-based embedded software of the overall system design in advance of any dedicated physical system implementation to reduce design risks, reduce cost, and support overall development lifecycle.

* * * * *